(12) United States Patent  
Christensen (10) Patent No.: US 6,650,111 B2
(45) Date of Patent: Nov. 18, 2003

(54) PULSED EXCITED PROXIMITY SENSOR

(75) Inventor: Timothy A. Christensen, Camano Island, WA (US)

(73) Assignee: Eaton Corporation, Cleveland, OH (US)

( * ) Notice: Subject to any disclaimer, the term of this patent is extended or adjusted under 35 U.S.C. 154(b) by 5 days.

(21) Appl. No.: 09/908,082

(22) Filed: Jul. 18, 2001

(65) Prior Publication Data

US 2003/0016008 A1 Jan. 23, 2003

(51) Int. Cl.$^7$ .................................................. G01B 7/14
(52) U.S. Cl. ........................ 324/207.26; 324/207.12; 324/207.16
(58) Field of Search ................................. 324/654, 656, 324/655, 657, 207.12, 207.15, 207.16, 207.22, 207.26, 236; 73/862.331, 862.335, 862.336

(56) References Cited

U.S. PATENT DOCUMENTS

| | | | | | |
|---|---|---|---|---|---|
| 3,395,338 | A | * | 7/1968 | Barringer | 324/336 |
| 3,609,580 | A | * | 9/1971 | Thompson et al. | 331/65 |
| 3,756,081 | A | * | 9/1973 | Young | 73/584 |
| 4,068,189 | A | * | 1/1978 | Wilson | 331/65 |
| 4,560,929 | A | * | 12/1985 | Melnyk | 324/207.16 |
| 4,843,259 | A | * | 6/1989 | Weisshaupt | 327/510 |
| 5,072,180 | A | * | 12/1991 | Moreau | 324/207.26 |
| 5,198,764 | A | * | 3/1993 | Spencer | 324/207.26 |
| 5,264,733 | A | | 11/1993 | Tigges | 307/116 |
| 5,273,151 | A | * | 12/1993 | Carmen et al. | 194/319 |
| 5,498,958 | A | * | 3/1996 | Tu et al. | 324/207.16 |
| 5,508,662 | A | * | 4/1996 | Guichard et al. | 331/65 |
| 5,608,318 | A | | 3/1997 | Yasui | 324/233 |
| 6,014,022 | A | * | 1/2000 | Demma et al. | 324/207.12 |
| 6,025,711 | A | * | 2/2000 | Demma et al. | 324/207.26 |
| 6,130,489 | A | * | 10/2000 | Heimlicher | 307/125 |

\* cited by examiner

*Primary Examiner*—N. Le
*Assistant Examiner*—Reena Aurora
(74) *Attorney, Agent, or Firm*—Quarles & Brady LLP (57) ABSTRACT

A proximity sensor has a transducer coil that is part of an oscillator circuit. The oscillating signal varies as a function of the presence or absence of a metallic object adjacent the transducer coil. By analyzing selected characteristics of that oscillating signal, the presence of and object and the distance to the object can be determined. Other analysis techniques enable the sensor to distinguish between ferrous and non-ferrous materials. A mechanism also is provided to automatically configure operation of the proximity to avoid interference from another adjacent proximity sensor.

39 Claims, 7 Drawing Sheets

PULSED EXCITED PROXIMITY SENSOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to devices for detecting the presence of an object, and more particularly to inductance type proximity sensors.

2. Description of the Related Art

Proximity sensors are commonly used along assembly lines to detect the presence of a work piece passing nearby. The presence of a work piece activates equipment that perform manufacturing operations.

One common type of sensor uses a transducer coil along with a tuning capacitor to form a resonant circuit of a free running oscillator. The transducer coil is located adjacent the path along with the work pieces pass. Eddy currents form in a conductive work piece approaching the coil and have a magnitude that is proportional to the magnetic flux lines impinging the work piece surface. The eddy currents alter the inductance of the transducer coil and the series resistance of the coil and its core. The change in the impedance affects the quality factor Q of the tuned circuit causing the peak-to-peak oscillator voltage to decrease in proportion to the change of the Q. Typically the loading of the coil by a work piece of ferrous metal causes circuit to stop oscillating. Thus the presence of a metallic object can be determined by monitoring whether the circuit is oscillating.

This type of proximity sensor has several drawbacks. In many applications, it is often desirable to know the relative position of the object being sensed. Such information is used to determine whether the object is properly positioned along the conveyor mechanism of the assembly line and coordinate the operation of manufacturing equipment. However, the sensor is binary in that its oscillator runs when an metallic object is not present and stops whenever a metallic object passes anywhere within the sensing range and can not provide information regarding the distance between the sensor and the work piece.

A second drawback relates to the detection of objects of different metals. Quite commonly, the sensing range of an inductance type proximity sensor is normalized using ferrous targets. As a consequence non-ferrous objects, such as those of aluminum, have an equivalent sensing range of approximately 45 percent of that normalized range. Thus, the sensor may not be capable of detecting non-ferrous work pieced passing along the far side of the assembly line from the coil. Conversely, if the proximity sensor is configured with greater sensitivity for non-ferrous metal objects, a ferrous object moving beyond the assembly line could trigger a false presence detection.

In some applications of these proximity sensors it is desirable to distinguish between ferrous and non-ferrous metallic objects. However present techniques for that discrimination are quite elaborate and often require expensive manufacturing processes or special metal disks and plastic spacers.

SUMMARY OF THE INVENTION

A proximity sensor for detecting presence of a metallic object includes a drive circuit connected to a transducer coil to generate an oscillating signal. That signal has oscillations which vary in response to whether or not a metallic object is adjacent to the transducer coil and in response to the distance between the object and the transducer coil. A processing circuit detects a characteristic of the oscillations and employs that characteristic to produce a indication of the presence of an object. Preferred embodiment of the proximity sensor employ the frequency and the decay rate of the oscillations to determine the presence of an object.

In one version the proximity sensor utilizes a resonant circuit that is stimulated by a voltage pulse of a short duration, after which the resonant circuit is allowed to ring down whereby the oscillations decay exponentially. The exponential decay of the signal in the resonant circuit is proportional to the quality factor Q, which varies in relation to the distance to a metallic object. This decay is characterized in a manner which enables a determination of not only the presence of a metallic object, but also the distance between the sensor and that object. Further analysis can determine whether the target is a ferrous or non-ferrous metal. As a result the sensor can be configured to respond to only ferrous or only non-ferrous objects.

Other aspects of the present invention include programming the circuitry of the proximity sensor by coupling a serial data signal to the transducer coil and providing a damping circuit to prevent the resonant circuit from ringing in response to the serial data signal.

DETAILED DESCRIPTION OF THE INVENTION

Figure 1:
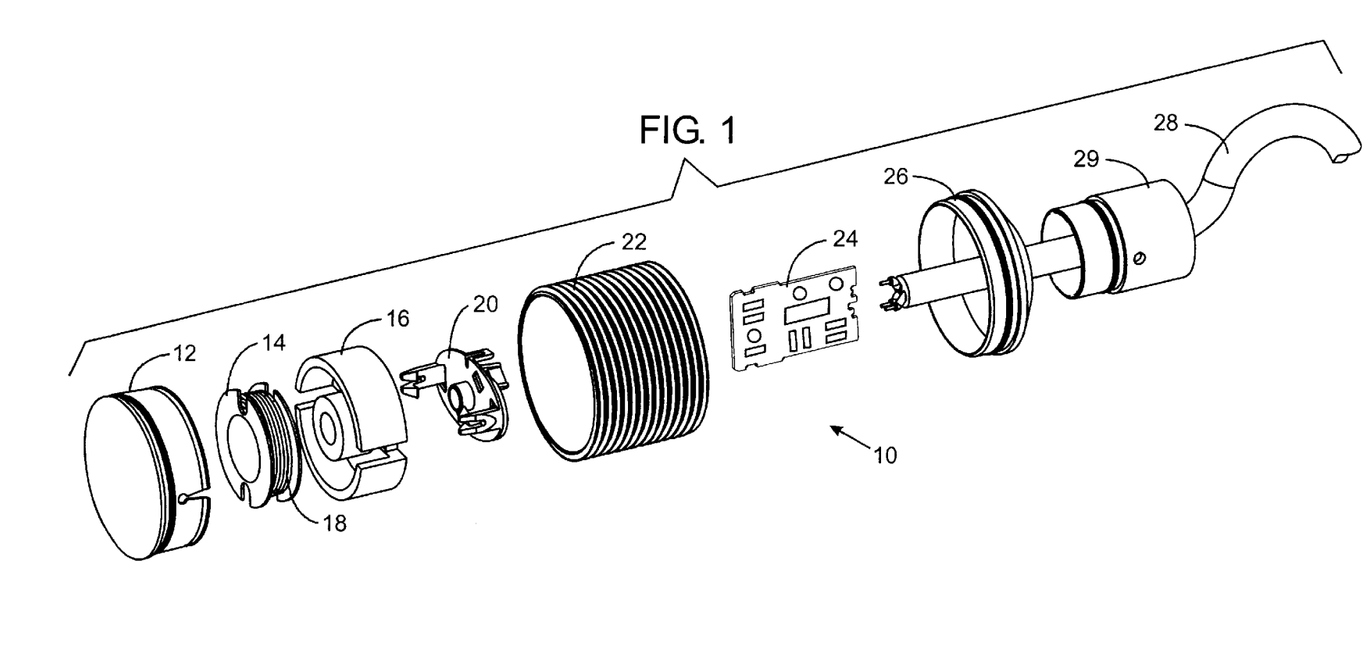
FIG. 1 is an exploded view of a proximity sensor according to the present invention.

With initial reference to FIG. 1, a proximity sensor 10 has a plastic resin head 12, formed in a cup shape inside of which fit a bobbin 14 within a pot-core 16. A coil 18 of wire is wound on the bobbin 14 and is connected electrically to clips on one side of a connector 20. On the opposite side of the connector 20, the clips engage pads on a printed circuit board 24 which contains the electronic circuitry of the proximity sensor.

The components described thus far, fit within a collar 22 that has external screw threads and two open ends. The head 12 closes one end and extends outwardly there from. The opposite end of the collar 22 is sealed by a cap 26 which has a large circular opening through which a support 29 extends. The support 29 is hollow and has an internal grooved structure for supporting the printed circuit board 24. A multi-conductor cable 28 extends through the support 29 and has conductors attached to the printed circuit board 24. The conductors carry electrical power and signals to and from the printed circuit board.

The proximity sensor 10 is located adjacent the area through which the objects to be detected travel so that the objects will pass within a predefined distance from the sensor corresponding to a detection range. For example, a bracket with a threaded aperture is mounted by the appropriate means at that location. The threaded collar 22 of the proximity sensor is inserted into the aperture, and threaded therein to secure the sensor in place. If necessary, locking nuts may be employed to secure the sensor in the bracket.

Figure 2:
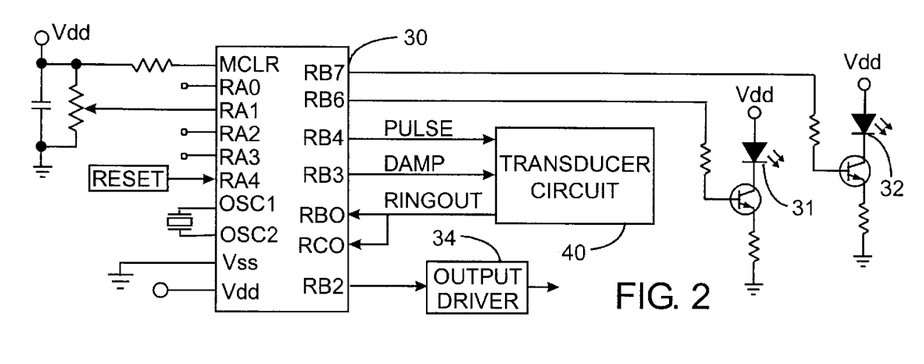
FIG. 2 is a block diagram of the electronic circuit of the proximity sensor.

With reference to FIG. 2, the electronic circuitry on circuit board 24 is built around a conventional microcomputer 30 which contains an internal microprocessor, memory which stores the software to be executed and the data used by that software, and input/output circuits for interfacing the microprocessor to external components. For example, the microcomputer 30 operates a pair of light emitting diodes 31 and 32 to indicate various operating conditions of the sensor. These light emitting diodes are visible through openings in the support 29. The microcomputer 30 also has a serial output port connected to an output driver 34 which applies a data signal to a conductor of the cable 28 which provides an indication of whether or not an object has been detected and other information about the object as described hereinafter.

Figure 3:
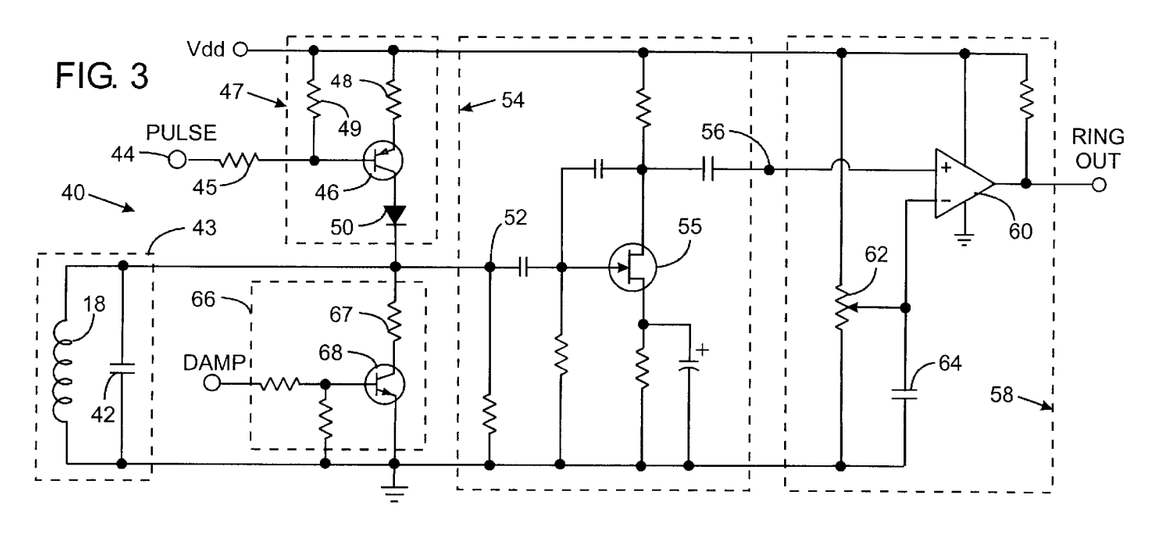
FIG. 3 is a schematic diagram of the transducer circuit of the proximity sensor.

The microcomputer 30 also is connected to a transducer circuit 40, shown in detail in FIG. 3. The coil 18 of the proximity sensor 10 is connected in parallel with a capacitor 42 to form a resonant circuit 43. The transducer circuit 40 receives a signal, designated PULSE, from the microcomputer 30 at terminal 44. This signal is coupled through a first resistor 45 to a drive circuit 47 and specifically to the base of a first transistor 46 which also is connected to a source of a positive supply voltage (Vdd) by a first resistor 49. The emitter of the first transistor 46 is connected to the source of positive supply voltage (Vdd) by a second resistor 48. A blocking diode 50 couples the collector of the first transistor 46 to one side of both the resonant circuit 43, the other side of which is connected to circuit ground.

As will be described, the PULSE signal applied to terminal 44 by the microcomputer 30 momentarily turns on the first transistor 46, thereby applying a positive voltage pulse to the resonant circuit 43 comprising transducer coil 18, capacitor 42, and the inherent resistance of the transducer coil.

The resonant circuit 43 also is connected to an input node 52 of an amplifier 54. This optional amplifier 54 serves to increase the sensitivity of the proximity sensor 10. The amplifier 54 includes a field effect transistor 55 and produces an amplified signal at an output node 56. The output node 56 is connected to a comparator 58 and more particularly to the non-inverting input of a differential amplifier 60. The inverting input of the differential amplifier 60 is connected to the wiper of a potentiometer 62 that is connected between the source of positive voltage Vdd and ground potential. A capacitor 64 also connects the inverting input of a differential amplifier 60 to ground potential. As will be described, the potentiometer 62 allows adjustment of a threshold voltage used to discriminate the characteristics of an oscillating signal from the resonant circuit 43. The output of the differential amplifier 60 is a signal designated RING OUT which is applied to a pair of inputs of the microcomputer 30. One of those inputs is an interrupt line which upon receiving an active RING OUT signal triggers the counting of pulses of the RING OUT signal applied at the other input.

When the proximity sensor 10 is active, due to the application of power via cable 28, the microcomputer 30 periodically applies the PULSE signal to terminal 44 of the transducer circuit 40. The PULSE signal is a brief excitation pulse which momentarily turns on the first transistor 46 to apply a positive voltage pulse to the resonant circuit 43 formed by the transducer coil 18 and capacitor 42.

Figure 4:
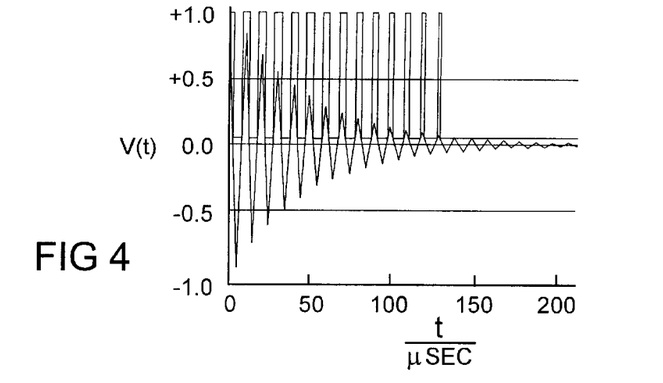
FIGS. 4–6 illustrate the waveform of a signal in a section of the transducer circuit under different operating conditions.

At the termination of that excitation pulse, the resonant circuit's oscillations begins to decay exponentially as shown by the dampened sinusoidal waveform in FIG. 4. For example, this waveform is produced by the transducer circuit 40 when an object is not present within the sensing range of the proximity sensor 10. The rate of decay is a function of the Q factor of the resonant circuit 43 which in turn is a function of the inductance and capacitance of that resonant circuit. The voltage peaks of the oscillating signal V(t) decay at the neper frequency of $e^-$. It can be proven that after "Q" cycles the signal voltage has decayed to a value $e^{-\pi}$ which equates to 4.32 percent of the voltage applied to the resonant circuit by turning on the first transistor 46. Therefore, the number of positive peaks that are greater than the $e^{-\pi}$ value of V(t) denotes the Q of the resonant circuit. This, provides a very effective way to digitally measure the Q of the resonant circuit 43.

The inductance of the transducer coil 18 and thus the resonant circuit's Q factor changes when an metal object is present within the sensing range of the apparatus and by an amount related to the distance between the transducer coil 18 and that object. Thus, the presence or absence of a metallic object, as well as the distance to an object, can be determined by analyzing the characteristics of the exponentially decaying waveform of the signal from the resonant circuit 43.

For such analysis, the resonant circuit signal after amplification by amplifier 54 is applied to the comparator 58. The potentiometer 62 is adjusted to furnish a voltage to the inverting input of the differential amplifier 60 which corresponds to $e^{-\pi}$ of the supply voltage Vdd that excited the resonant circuit. Thus, the differential amplifier 60 will produce an output pulse whenever the oscillating signal at node 56 exceeds the $e^{-\pi}$ voltage level. Therefore, the number of pulses in the RING OUT signal from the comparator 58 represents the Q of the transducer resonant circuit 43.

Figure 5:
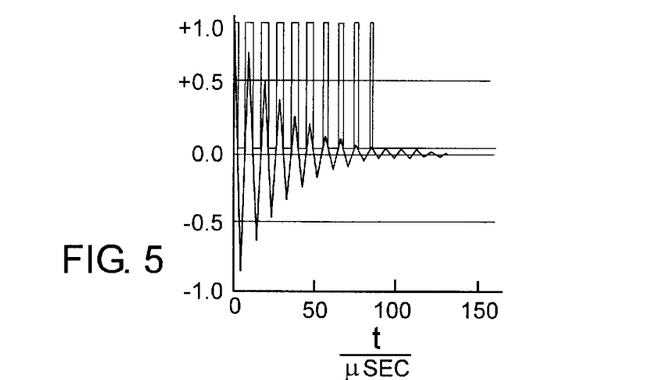

The RING OUT signal pulses, which occur following the application of the PULSE signal, are counted by the microcomputer 30. As noted previously the Q factor of the resonant circuit 43 varies in response to the presence of a metallic object and the distance between that object and the transducer coil. Specifically, when an metal object is present, the Q factor is lower and less pulses are passed by the comparator 58 than in the absence of such as object. FIG. 5 represents an exemplary decaying waveform produced by the resonant circuit when a ferrous metal object is within the range of the proximity sensor 10. The ferrous metal has a negligible effect on the inductance of the transducer coil 18, thus the frequency of the oscillations remains the same as without the object being present. However, the ferrous metal object alters the Q factor of the resonant circuit 43 which produces a more rapid dampening of the oscillations. As a consequence, there are less pulses with peaks above the $e^{-tt}$ voltage level and thus fewer pulses of the RING OUT signal are produced by the comparator 58 than when an object was not present.

By counting the number of pulses from the comparator 58, the microcomputer 30 thus is able to distinguish between the presence and absence of a metallic object within the range of the proximity sensor 10. Furthermore, the variation of the Q factor, and thus the dampening rate of the signal is a function of the distance between the proximity sensor coil 18 and the metallic object. The closer the object, the lower the Q factor and the more rapid the dampening. This also reduces the number of pulses which are passed by the comparator 58. Therefore, count of pulses also indicates the relative proximity of the metallic object.

Although merely counting the number of pulses produced by the comparator 58 provides a satisfactory mechanism for discriminating between the presence and absence of an object, other mechanisms for characterizing the exponential decay of the oscillating signal can be employed. For example, as seen in FIG. 5 the width of the RING OUT signal pulses becomes smaller as the decay progresses so that the decay can be characterized by integrating that signal. Such integration is relatively easy accomplish from the squared version of that the sinusoid at the output of the comparator 58. Specifically, the microcomputer 30 can be programmed to count cycles of a clock signal that occur during each pulse of the RING OUT signal. The clock signal has a relatively high frequency as compared to the frequency of the RING OUT signal. The total number of clock pulses counted in this manner corresponds to the power loss due to the eddy currents in the object being sensed. This approach can provide additional sensing resolution over merely counting the pulses.

The proximity sensor 10 also is capable of distinguishing between ferrous and non-ferrous metal objects within it's sensing range. These two categories of metals affect the exponentially decaying resonant circuit signal in different ways. As noted previously, presence of ferrous metal has a negligible effect on the frequency of the oscillations, but does alter the Q factor of the resonant circuit which produces a more rapid dampening of the oscillations. In contrast, a non-ferrous metal object causes the frequency of the oscillations to change while having a significantly lesser effect on the Q factor and dampening of the oscillations. Thus by determining the degree to which of these two signal characteristics change, the microcomputer 30 is able to distinguish between these types of metal.

Figure 6:
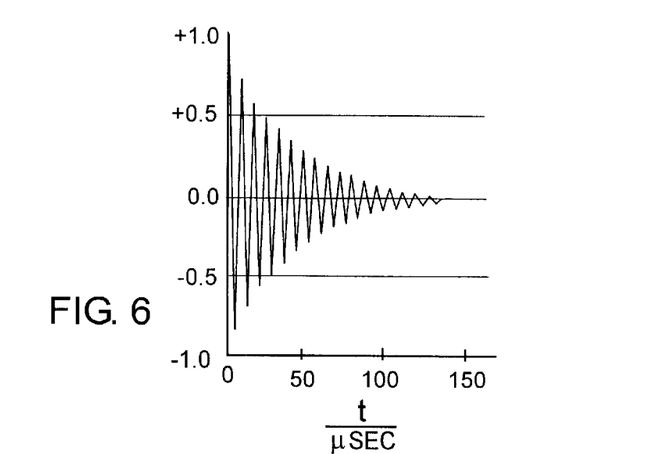

For example, an identical object made of a non-ferrous metal, such as aluminum, positioned at the same distance from the transducer coil 18 as the ferrous metal object that produced the waveform in FIG. 5 results in the resonant circuit producing the waveform similar to that shown in FIG. 6. The resultant signal has a higher frequency and a lesser exponential decay rate. As a consequence, when this waveform is applied to the comparator 58, the resultant RING OUT signal comprises a greater number of pulses occurring at a higher frequency than the RING OUT signal produced by a ferrous metal object as in the waveform of FIG. 5.

Therefore, if a mixture of objects made of ferrous or non-ferrous material travel along the assembly line, the signal from the proximity sensor 10 enables microcomputer 30 to distinguish between those two types of objects based on the exponential decay rate and frequency of the RING OUT signal. Specifically, the microcomputer can detect the signal frequency by counting the number of pulses that occur within a fixed time interval, and can determine the exponential decay rate from the Q of the resonant circuit by counting the total number of pulses that exceed the $e^{-n}$ voltage level. The two resultant values will be significantly different depending upon whether the object that produced the signal is made of a ferrous or non-ferrous metal. As a consequence, the microcomputer 30 can make a determination of the particular type of object that is now present adjacent the proximity sensor and provide that information to manufacturing equipment along the assembly line which can vary the manufacturing processes accordingly, as required by the particular type of object that is present. The microcomputer also can be programmed to respond to objects made of only one of these categories of metal.

Figure 7:
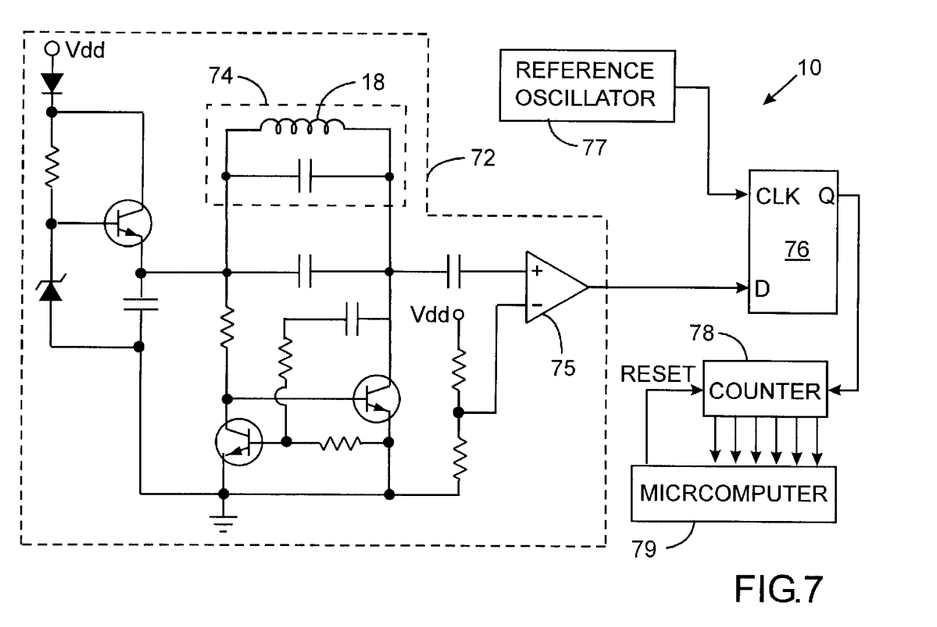
FIG. 7 is diagram of an alternative electronic circuit for the proximity sensor.

In applications where only non-ferrous metallic objects are to be detected, a proximity sensor can analyze only the frequency characteristic of the signal produced by the interaction of the object and the transducer coil. With reference to FIG. 7, the proximity sensor for this application has an electronic circuit 70 on the printed circuit board 24. That circuit incorporates the transducer coil 18 into a resonant circuit 74 of a transducer oscillator 72 which serves as a drive circuit to produce a sinusoidal signal. The transducer oscillator 72 is free-running, in that the sinusoidal signal is continuously produced whenever power is applied to the proximity sensor. A comparator 75 produces a square wave signal at the output of the transducer oscillator 72 in response to the sinusoidal signal.

The presence of a non-ferrous metallic object within the range of the transducer coil 18 changes the frequency of the square wave signal produces by the oscillator 72. The degree of that frequency shift is a function of the distance between that object and the transducer coil 18.

The transducer oscillator's output is connected to the data input of a flip-flop 76 that has a clock input which receives a square wave signal from a reference oscillator 77. The frequency of the signal from the reference oscillator 77 is the same as the frequency of the signal produced by the transducer oscillator 72 in the absence of a metallic object. Thus when an object is not present, the output of the flip-flop 76 will be static. However, the presence of a non-ferrous metal object causes a frequency shift of the signal produced by the transducer oscillator 72. The difference between the two signals applied to inputs of the flip-flop 76 cause the output of that latter device to change signal levels at a rate that corresponds to the frequency difference.

The pulses of the signal produced by the flip-flop 76 are applied to an input of a counter 78. The count generated by the counter 78 indicates the frequency difference and thus the presence of the non-ferrous metal object and the distance to that object. A microcomputer 79 reads that count at regular intervals to determine the presence and location of an object.

Figure 8:
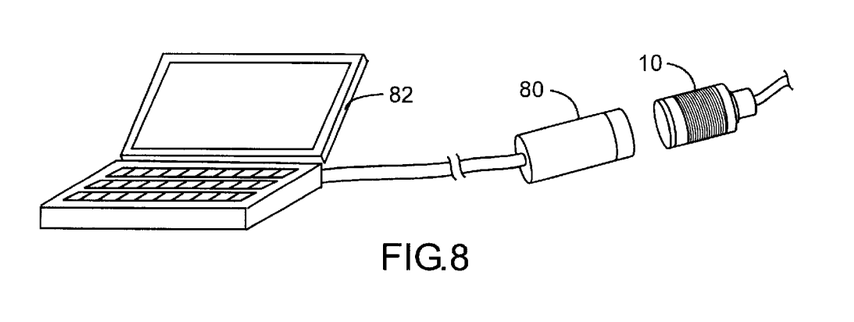
FIG. 8 is an isometric view of a proximity sensor being programmed.

Another aspect of the novel proximity sensor 10, is the ability to program the device via a signal magnetically coupled to the transducer coil 18. To accomplish this, a programming coil 80 is attached to a programming device, such as laptop computer 82, as shown in FIG. 8. The laptop computer executes a program that enables the operator to define various configuration parameters of the proximity sensor 10, such as whether the sensor is to responds only to ferrous metal objects and ignore the presence of non-ferrous objects. After the configuration parameters have been defined, the laptop computer 82 generates a serial data signal in a format (e.g. RS-232) that will be recognized by the proximity sensor 10. The serial data signal drives the programming coil 80 which produces a magnetic field that couples the data signal to the transducer coil 18 of the proximity sensor 10.

That magnetic coupling induces a current pulse into the resonant circuit 43 of the proximity sensor 10 for each pulse of the serial data signal. Each such electric current pulse will produce ringing in the resonant circuit which oscillations will decay exponentially. However, in the case of a pulse that is used to convey digital information to the proximity probe, such ringing is undesirable and it is preferable that only a single pulse appear. Therefore, a fast damping circuit 66 is provided across the resonant circuit 43, as shown in FIG. 3. The fast damping circuit 66 is enabled by a signal, designated DAMP, from the microcomputer 30 which turns on a second transistor 68 to connect resistor 67 across the resonant circuit 43. The resistor has a value that cause the resonant circuit to have a Q of substantially one which inhibits ringing when an electrical pulse is applied to that circuit.

In the programming mode, when a pulse is received by the transducer coil 18, it is passed through the amplifier 54. This pulse have a sufficiently high voltage level to produce a pulse of the RING OUT signal at the output of the comparator 58. Upon receiving that RING OUT signal pulse, the microcomputer 30 realizes that the pulse was not produced in response to activation of the transducer circuit 40 by the PULSE signal and thus will conclude that an external device may be attempting to communicate with the proximity sensor.

Upon realizing this condition, the microcomputer 30 produces an active DAMP signal which turns on the second transistor 68, thereby changing the Q factor of the resonant circuit 43 to one. This immediately terminates the ringing of the resonant circuit and any further oscillations which could produce pulses at the output of the comparator circuit 58. The DAMP signal remains active until an end of message sequence is received in the communication data from the external programming apparatus 80 and 82.

Upon recognizing that external pulses are being received, the microcomputer 30 commences executing a communications routine to decode the serial data signal being received by the transducer circuit 40. The received information is processed to derive commands and configuration parameters for the proximity sensor.

The microcomputer 30 also is able to transmit data to an external device via the transducer coil 18. In this instance, the data is converted into a predefined serial format (e.g. RS-232). Each pulse of the resultant serial data signal produces a pulse of the PULSE signal thereby turning on the first transistor 46 in the transducer circuit 40 to apply a current pulse to the resonant circuit in FIG. 3. In order to prevent ringing in the resonant circuit 43 the DAMP signal is active while data is being transmitted to change the Q factor of the resonant circuit 43 to one and inhibit ringing.

That data signal pulses conducted through the transducer coil are magnetically coupled to the external coil 82. The electric current induced in that external coil 82 is conveyed to a serial input port of the laptop computer which executes a communications routine to receive and process the serial data.

In many applications, several proximity sensors are placed relatively close together along an assembly line or on the same machine tool to control the operation of that equipment. This raises the possibility that the signal pulse from one sensor may be received by another adjacent sensor which cross talk between the sensors could inhibit accurate sensing of objects. The present proximity sensor provides a mechanism for detecting such cross talk, and controlling the intervals at which the resonant circuit is excited so as to eliminate the cross talk with respect to the sensing signal from the other sensor.

Figure 9:
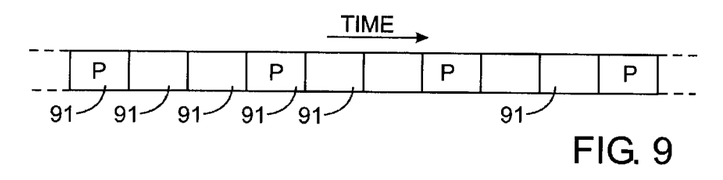
FIG. 9 illustrates a series of signal frames representing operation of the proximity sensor.

With reference to FIG. 9, the operation of the particular proximity sensor is controlled whereby the microcomputer 30 periodically activates the transducer circuit 40 to generate a sensing pulse in selected ones of periodically reoccurring signal frames 91. Each signal frame is significantly longer in duration than the longest decay of the ringing signal in the resonant circuit 43, as occurs when an object is not present as represented in FIG. 4, for example. FIG. 9 denotes an operating mode in which a pulse is emitted during every third signal frame, with the proximity sensor remaining silent during the intervening frames 91. However, the pulses may emitted more or less frequent depending upon configuration by the user and self configuration to avoid interference from adjacent sensors, as will be described. For example, the pulses could be emitted every other frame, every fourth frame, etc.

Figure 10:
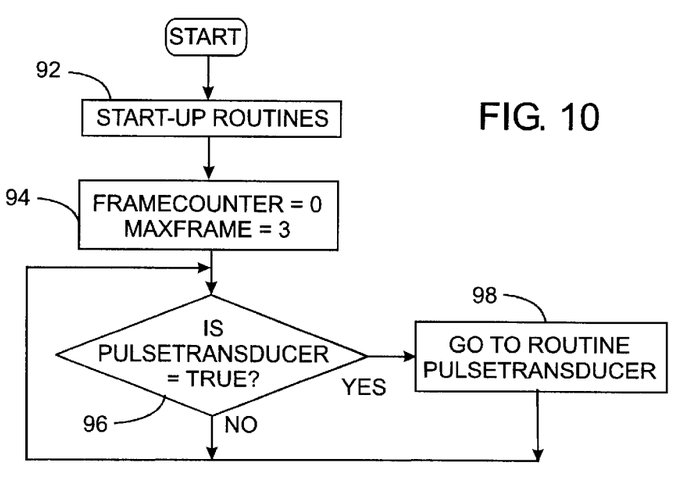
FIG. 10 is a flowchart depicting a high level software program that is executed by the microcomputer in the proximity sensor.

FIG. 10 is a flow chart of the high level software program that controls the proximity sensor operation. This program commences at step 92 at which a start-up routine is executed to configure the operation of the microcomputer 30 and the proximity sensor 10 in general. Next at step 94, a variable designated FRAMECOUNTER is set equal to zero and another variable designated MAXFRAME is set equal to 3. The variable MAXFRAME indicates the number of frames 91 in each sensing cycle, and in this example is set to 3 indicating that the resonant circuit 43 is to be excited every third signal frame 91. The value of the variable FRAMECOUNTER designates the number of the present frame and is reset to zero each time its value equals that of the variable MAXFRAME. As will be described, the resonant circuit 43 is excited each time the value of FRAMECOUNTER equals 0.

After the system has been configured, the program execution advances to step 96 where a determination is made whether it is now time to activate the transducer circuit 40. This is determined by the value of a variable PULSETRANSDUCER, which, as will described, this variable is set to be "true" or "false" by other routines executed by the microcomputer 30. If the value of the variable PULSETRANSDUCER is false, the program continues to loop until that value is true. When that occurs, the program execution advances to step 98 where a routine is called and executed to activate the transducer circuit 40 to apply an electrical pulse to the resonant circuit 43.

Figure 11:
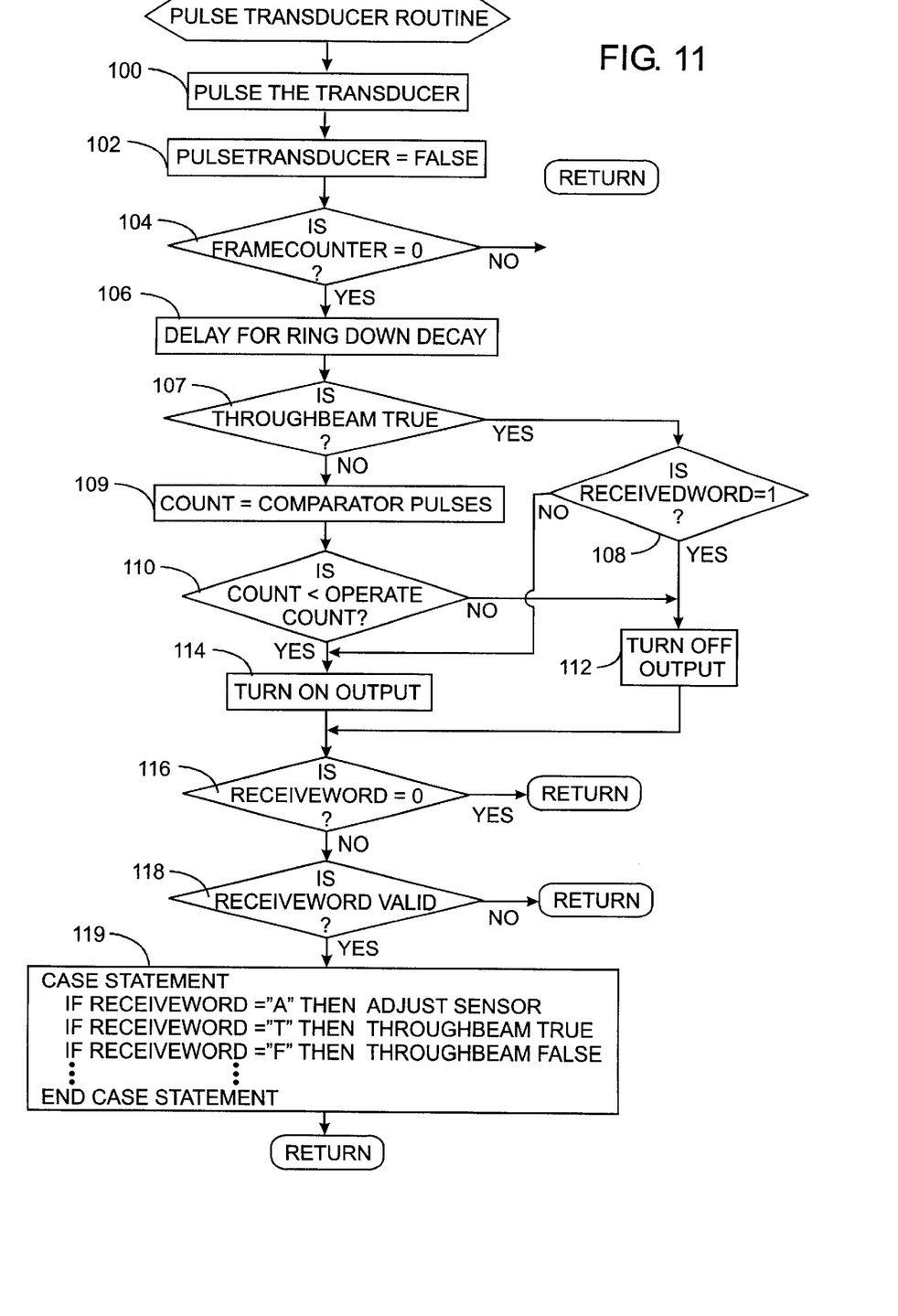
FIG. 11 is a flowchart of a pulse transducer software routine executed by the microcomputer.

That pulse transducer routine is depicted by the flow chart of FIG. 11 and commences by the microcomputer 30 issuing an active PULSE signal to the transducer circuit 40 at step 100. As described previously, this active PULSE signal causes the application of an electrical pulse to the resonant circuit 43 resulting in that circuit the ringing with an oscillating signal. At step 102, the variable PULSETRANSDUCER is set to be false to indicate that a pulse has been emitted and to inhibit temporarily further pulsing of the transducer circuit. At step 104, a determination is made whether the value of the variable FRAMECOUNTER equals zero. If it is not zero and a pulse was emitted, then the microcomputer is executing the pulse transducer routine in response to activation of a communication program and that the pulse is output data and not for object detection purposes. In that event, the pulse transducer routine terminates at step 104.

Otherwise, the recently generated signal pulse was for object sensing purposes and the program execution branches to step 106 where the software routine delays for a period of the time sufficient to allow the ringing in the resonant circuit 63 to fully decay. This delay allows an internal counter within the microcomputer 30 to tabulate the RING PULSES produced by the comparator 58 in the transducer circuit 40. That counter is separate from the PULSETRANSDUCER routine.

At the end of the delay, a variable designated THROUGHBEAM is inspected to determine whether it is true or false at step 107. This variable is set by the user during configuration of the proximity sensor 10 to indicate that a separate pulse transmitter is located on the opposite side of the path of the objects. In this configuration, the pulse from that transmitter will be received by the proximity sensor 10 when an object is not present and will be blocked by objects travel along the path. When the transmitted pulse is interrupted, the proximity sensor 10 may still emit a pulse of its own pulse to determine the distance to that object.

Therefore in the THROUGHBEAM mode, the sensing process branches to step 108 at which a variable designated RECEIVEWORD is inspected. The RECEIVEWORD variable stores data received by the transducer coil 18 from an external device and will have a value of zero when the pulse from the opposite transmitted is not received (object present). When an object is not present, the RECEIVEWORD variable has a value of one. Therefore, when an object is present (RECEIVEWORD=0), the output of the proximity sensor is turned on at step 114 measure distance to the object, and the output is turned off at step 112 in other cases.

When the proximity sensor 10 is not in the THROUGHBEAM mode, the program execution branches from step 107 to step 109 at which the count of the pulses from the transducer circuit 40 is read. This count then is compared at step 110 to a threshold value designated as OPERATE COUNT to determine whether or not an object is present. If the pulse count is less than this threshold, as occurs when an object is present, the execution of this routine by the microcomputer 30 branches to step 114 where the output driver 34 is activated to produce an object present signal. Otherwise, the program execution passes through step 112 where the output driver 34 is turned off to indicate the absence of an object.

The pulse transducer routine in FIG. 11 also is executed at the termination of a plurality of signal frames during which data was received from an external programming device, such as the one shown in FIG. 8. The transmission of data from a programming device comprises a series of digital words, each containing a plurality of bits (e.g. 8 bits). Thus, commencing at step 116, a determination is made whether a valid communication word has been received. Specifically, the variable RECEIVEWORD is used to store the bits received during such communication and this variable is inspected to determine whether is has a value of zero. A valid communication word will not contain all zeros and thus when this variable is equal to zero, a data word has not been received. When that is the case, the pulse transducer routine terminates by returning to the main program in FIG. 10. If however the value of the variable RECEIVEWORD is non-zero, the program execution advances to step 118 where the variable RECEIVEWORD is analyzed further to determine whether it is a valid communication word according to the particular protocol used by the programming device.

If that is the situation, the program continues to step 119 where a case statement is executed. This statement determines the alphanumeric character represented by the value of the RECEIVEWORD variable and then executes a programming subroutine associated with that character. For example, if the RECEIVEWORD value corresponds to the alphanumeric character "O", then the programming device desires to adjust the sensing range, or operate point, of the proximity sensor. This step also is executed when the user activates and deactivates the THROUGHBEAM mode when the programming device sends a "T" or an "F" character which becomes represented by the value of RECEIVEWORD. Once the appropriate case statement has been completed, the pulse transducer routine terminates by returning to step 96 in the main program of FIG. 10.

As noted previously, there is potential that two closely spaced proximity sensors 10 may interfere with one another by transmitting pulses at approximately the same times. The present sensor provides a mechanism for avoiding such conflict. Whenever the transducer circuit 40 receives a pulse, it applies the resultant RING PULSE signal to the microcomputer 30. The first pulse of the RING PULSE signal during a signal frame 91 activates an interrupt of the microcomputer. This causes the execution of the transducer pulse interrupt routine shown in FIG. 13. Initially, at step 130, the value of a variable designated COUNTS is set to zero. Then as step 132, a determination is made whether the variable FRAMECOUNTER is zero, as occurs at times when the proximity sensor 10 is reacting to a excitation pulse from the transducer circuit 40. If that is the case, the COUNT variable is set to zero at step 133 before the transducer pulse interrupt routine terminates.

Figure 13:
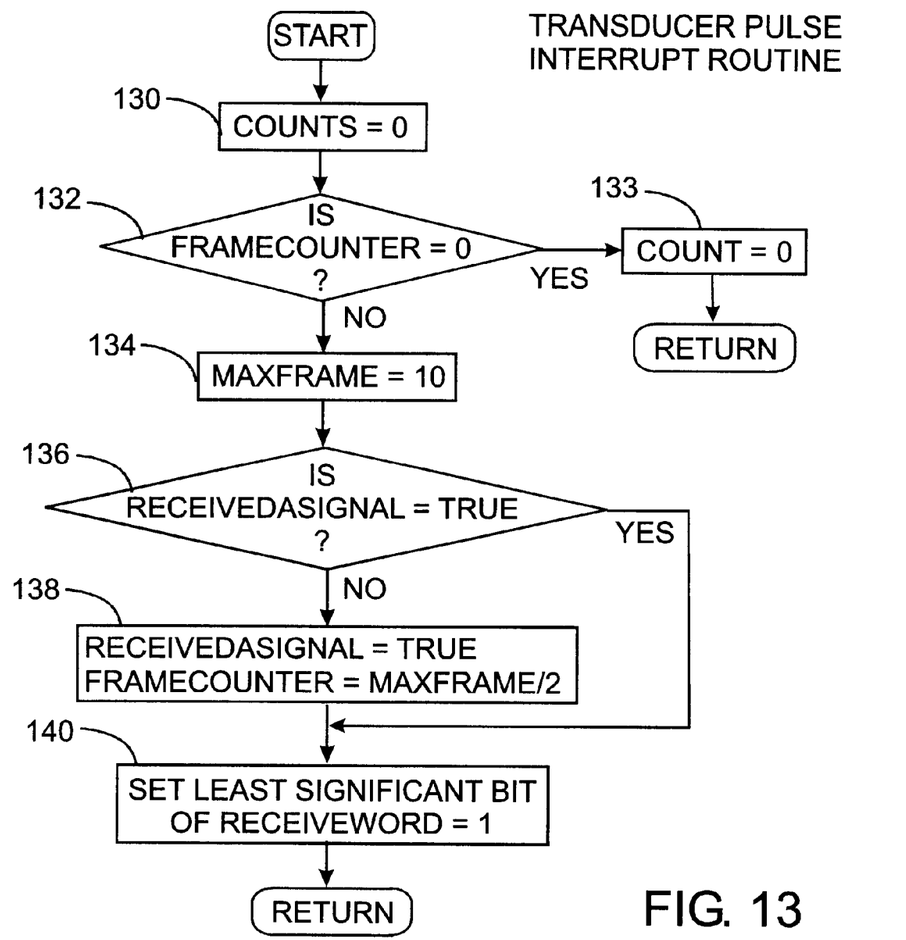
FIG. 13 is a flowchart of a transducer pulse interrupt software routine executed by the microcomputer.

Otherwise, the microcomputer 30 concludes that the newly received pulse was not produced in response to pulsing of the transducer circuit 40, and thus probably corresponds to either noise or the pulse produced by an adjacent proximity sensor that is electromagnetically coupled to the coil 18 of the transducer circuit. In that event, the program execution branches to step 134 where the value of the variable MAXFRAME is set equal to ten. As noted previously, this variable designates the number of signal frames 91 which are to occur between each excitation of the transducer circuit 40. Whereas this value was previously set to three at step 94, it is now incremented to ten, which is longer that the number of bits within each word used in the communication protocol.

At step 136 a determination is made whether the variable RECEIVEDASIGNAL is true. If that is not the case, the program execution advances to step 138 where the RECEIVEDASIGNAL variable is set true and the FRAMECOUNTER variable is set equal to one-half of the value of the variable MAXFRAME (e.g. five). This latter step places the operation of the sensor in the middle of the sequence of sensing frames between when the transducer circuit 40 will be excited. Thus, the transducer circuit will be pulsed for object sensing half-way between the when the adjacent proximity sensor will activate. Such adjacent proximity sensor will also be executing a similar routine which increases the number of frames between activation of its transducer circuit, and thus the two proximity sensors will not produce sensing pulses which could overlap or interfere with one another.

Then at step 140, the least significant bit of the variable RECEIVE WORD is set equal to one, so that during a communication with an external programming device, this bit position will be set to one in response to the received data pulse. The transducer pulse interrupt routine then terminates by returning to the main program in FIG. 10.

Figure 12:
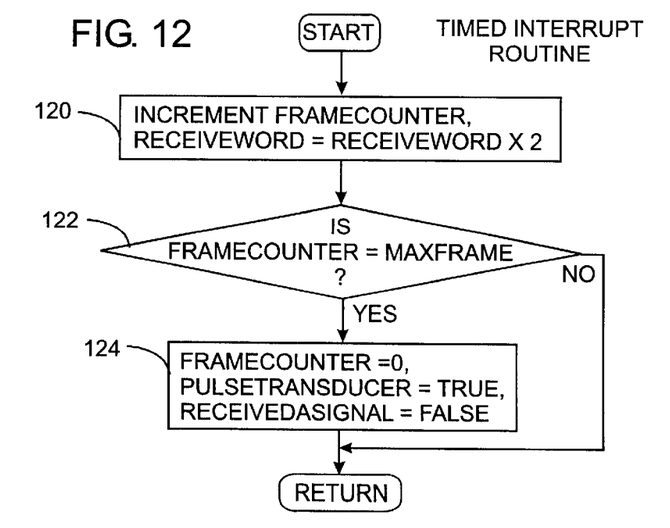
FIG. 12 is a flowchart of a timed interrupt software routine executed by the microcomputer.

With reference to FIG. 12. the microcomputer 30 also executes a timed interrupt routine that is executed at regular intervals which can be between 0.1 millisecond and 25 milliseconds, which defines the length of the signal frame 91. Upon the occurrence of this timed interrupt, the microcomputer at step 120 increments the value of the variable FRAMECOUNTER which provides in indication of the count of the number of frames which occur between each signal pulse. The contents of the variable RECEIVEWORD is then shifted by one bit position to prepare the variable to receive the next bit of any communication signal that is occurring. Note that a one bit will have been stored in this least significant bit position when a pulse is received in the just completed signal frame. Otherwise, a zero will be present in that bit position.

Then a determination is made at step 122 whether the value of the variable FRAMECOUNTER equals the value of variable MAXFRAME, as occurs when it is time to once again excite the resonant circuit 43 in the transducer circuit 40. If it is not that time, the interrupts routine terminates. When the transducer circuit 40 is to be excited during the next signal frame 91, the program execution at step 124 sets the value of the variable FRAMECOUNTER to zero, and sets the variable PULSETRANSDUCER true. The value of the variable RECEIVEDASIGNAL is then set false before the interrupt routine terminates.

What is claimed is:

1. A proximity sensor for detecting presence of a metallic object, said proximity sensor comprising:
    a transducer coil;
    a drive circuit connected to the transducer coil to generate an oscillating signal having a waveform that varies in response to whether or not a metallic object is adjacent to the transducer coil; and
    a processing circuit connected to the drive circuit to measure a Q factor of the transducer coil in response to the characteristic of the waveform, and in response produce an indication of whether or not a metallic object is adjacent to the transducer coil.

2. The proximity sensor as recited in claim 1 wherein the processing circuit determines a distance between the transducer coil and the object in response to a rate of decay of the oscillating signal.

3. The proximity sensor as recited in claim 1 wherein the processing circuit determines a distance between the transducer coil and the object in response to a frequency of the oscillating signal.

4. The proximity sensor as recited in claim 1 wherein the processing circuit determines whether an object that is present contains a material selected from a group consisting of ferrous metal and non-ferrous metal.

5. The proximity sensor as recited in claim 1 further comprising a capacitor connected in parallel with the transducer coil to form a resonant circuit, and wherein the drive circuit applies a pulse of electric voltage to the resonant circuit.

6. The proximity sensor as recited in claim 5 wherein the processing circuit counts cycles of the oscillating signal in the resonant circuit.

7. The proximity sensor as recited in claim 5 wherein the processing circuit counts peaks of the oscillating signal which peaks have a voltage level greater than a predefined value.

8. The proximity sensor as recited in claim 7 wherein the predefined value corresponds to 4.32 percent of the level of the voltage pulse applied to the resonant circuit.

9. A proximity sensor for detecting presence of a metallic object, said proximity sensor comprising:
    a transducer coil;
    a drive circuit connected to the transducer coil to generate an oscillating signal having a waveform that varies in response to whether or not a metallic object is adjacent to the transducer coil;
    a processing circuit connected to the drive circuit to detect a characteristic of the waveform selected from a group consisting of frequency and rate of signal decay, and in response produce an indication of whether or not a metallic object is adjacent to the transducer coil; and
    a detector connected to the transducer coil to determine whether a signal in the transducer coil is produced by another proximity sensor and if so, said detector configures operation of the drive circuit to avoid conflict between an oscillating signal resulting from the drive circuit and signals produced by another proximity sensor.

10. The proximity sensor as recited in claim 9 wherein the detector configures the drive circuit to generate oscillating signals in the transducer coil at intervals wherein the signals produced by another proximity sensor occur between the oscillating signals.

11. The proximity sensor as recited in claim 10 wherein the detector adjusts the intervals in response to occurrence of the signals produced by another proximity sensor.

12. A proximity sensor for detecting presence of a metallic object, said proximity sensor comprising:
    a transducer coil and a capacitor connected in parallel to form a resonant circuit;
    a drive circuit connected to the resonant circuit to apply an electric pulse to the resonant circuit which causes the resonant to produce an oscillating signal; and
    a processing circuit connected to the drive circuit to measure a frequency of the oscillating signal, and having a comparator coupled to the resonant circuit and providing an indication when an oscillation of the oscillating signal exceeds a predefined voltage and in response thereto produce an indication of whether or not a metallic object is adjacent to the transducer coil.

13. The proximity sensor as recited in claim 12 wherein the processing circuit determines whether an object is present in response to a rate of decay of the oscillating signal.

14. The proximity sensor as recited in claim 12 wherein the processing circuit determines a distance between an object that is present and the transducer coil in response to a rate of decay of the oscillating signal.

15. The proximity sensor as recited in claim 12 wherein the processing circuit determines a distance between an object that is present and the transducer coil in response to a frequency of the oscillating signal.

16. The proximity sensor as recited in claim 12 wherein the processing circuit distinguishes between an object made of a ferrous metal and an object made of a non-ferrous metal in response to frequency and rate of decay of the oscillating signal.

17. The proximity sensor as recited in claim 12 wherein the predefined voltage corresponds to 4.32 percent of the voltage level of the electric pulse applied to the resonant circuit.

18. The proximity sensor as recited in claim 12 wherein the processing circuit further comprises a counter connected to the comparator and providing a count of how many cycles of the oscillating signal exceed a predefined voltage.

19. The proximity sensor as recited in claim 12 wherein the processing circuit further comprises a counter connected to the comparator and providing a count of how many oscillations of the oscillating signal occur during a given period of time.

20. The proximity sensor as recited in claim 12 further comprising a damping circuit connected to the resonant circuit to terminate the oscillating signal in response to a control signal applied to the damping circuit.

21. A proximity sensor for detecting presence of a metallic object, said proximity sensor comprising:
   a transducer coil;
   a drive circuit connected to the transducer coil to generate an oscillating signal having a frequency that varies in response to whether or not a metallic object is adjacent the transducer coil; and
   a processing circuit connected to the drive circuit to detect a frequency of the oscillating signal and in response indicate whether or not a metallic object is adjacent the transducer coil, the processing circuit including a reference oscillator that produces a reference signal, a circuit connected to the transducer coil and the reference oscillator to produce an output signal that indicates a difference in frequency between the oscillating signal and the reference signal, and a counter connected to the circuit and providing a count of pulses of the output signal that occur during a given period of time.

22. The proximity sensor as recited in claim 21 wherein the circuit of the processing circuit comprises:
   a flip-flop having a first input connected to the drive circuit, a second input connected to the reference oscillator, and an output at which a signal is produced that indicates a difference in frequency between the oscillating signal and the reference signal
   wherein the counter has an input connected to the output of the flip-flop.

23. A method for detecting presence of a metallic object, said method comprising:
   exciting a transducer coil to generate an oscillating signal having a waveform that varies in response to whether or not a metallic object is adjacent to the transducer coil
   measuring the frequency of the oscillating signal by counting cycles of the oscillating signal flowing through the transducer coil; and
   in response to the frequency of the oscillating signal producing an indication of whether or not a metallic object is adjacent to the transducer coil.

24. The method as recited in claim 23 wherein exciting the transducer coil comprises applying an electrical pulse to the transducer coil.

25. The method recited in claim 23 further comprising measuring a Q factor of the transducer coil.

26. The method as recited in claim 23 wherein counting cycles of the oscillating signal comprises counting peaks of the oscillating signal which peaks have a voltage level greater than a predefined value.

27. The method as recited in claim 26 wherein the predefined value corresponds to 4.32 percent of a voltage level applied to excite the transducer coil.

28. The method as recited in claim 23 further comprising coupling a serial data signal from a programming device to the transducer coil.

29. The method as recited in claim 23 further comprising coupling a serial data signal, having a plurality of pulses, to the transducer coil; and following receipt of each of the plurality of pulses at the transducer coil, activating a damping circuit connected to the transducer coil to terminate oscillation produced by the pulse.

30. The method as recited in claim 29 wherein the activating a damping circuit changes a Q factor of the transducer coil to substantially one.

31. The method as recited in claim 23 further comprising detecting whether a signal in the transducer coil was produced by another proximity sensor; and if so, controlling exciting the transducer coil to avoid conflict between an oscillating signal resulting from exciting the transducer coil and signals produced by another proximity sensor.

32. The method as recited in claim 31 wherein controlling exciting the transducer coil generates oscillating signals in the transducer coil at intervals wherein the signals produced by another proximity sensor occur between the oscillating signals.

33. The method as recited in claim 32 wherein controlling exciting the transducer coil adjusts the intervals in response to occurrence of the signals produced by another proximity sensor.

34. A method for detecting presence of a metallic object, said method comprising:
   applying an electrical pulse to a resonant circuit that has a transducer coil and a capacitor connected in parallel, which thereby generates a decaying oscillating signal; and
   analyzing the decaying oscillating signal to determine a Q factor; and
   in response to the analyzing, producing an indication of whether or not a metallic object is adjacent to the transducer coil.

35. The method as recited in claim 34 wherein the analyzing determines a rate of decay of the oscillating signal.

36. The method as recited in claim 34 further comprising measuring a frequency of the oscillating signal.

37. A proximity sensor for detecting presence of a metallic object, said proximity sensor comprising:
   a transducer coil;
   a drive circuit connected to the transducer coil to generate an oscillating signal having a waveform that varies in response to whether or not a metallic object is adjacent to the transducer coil;
   a processor connected to the drive circuit to detect a characteristic of the waveform and in response produce an indication of whether or not a metallic object is adjacent to the transducer coil; and
   a detector connected to the transducer coil to determine whether a signal in the transducer coil was produced by another proximity sensor and if so said detector configures operation of the drive circuit to avoid conflict between an oscillating signal resulting from the drive circuit and signals produced by another proximity sensor.

38. The proximity sensor as recited in claim 37 wherein the detector configures the drive circuit to generate oscillating signals in the transducer coil at intervals wherein the signals produced by another proximity sensor occur between the oscillating signals.

39. The proximity sensor as recited in claim 38 wherein the detector adjusts the intervals in response to occurrence of the signals produced by another proximity sensor.

* * * * *